United States Patent [19]

Klein

[11] 3,912,380

[45] Oct. 14, 1975

[54] COMPOSITE TYPE STRUCTURE FOR LARGE REFLECTIVE MIRRORS

[75] Inventor: Leo A. Klein, Seattle, Wash.

[73] Assignee: The Boeing Company, Seattle, Wash.

[22] Filed: June 25, 1973

[21] Appl. No.: 373,548

[52] U.S. Cl. ............... 350/310; 350/288; 350/293; 350/292
[51] Int. Cl. ........................................... G02b 5/08
[58] Field of Search .......... 350/288, 292, 293, 299, 350/310

[56] References Cited
UNITED STATES PATENTS

| | | | |
|---|---|---|---|
| 1,434,860 | 11/1922 | Taylor | 350/310 |
| 1,890,166 | 12/1932 | Shatto et al. | 350/310 |
| 2,468,568 | 4/1949 | McCusker | 350/310 |
| 3,489,484 | 1/1970 | Brown | 350/310 |
| 3,600,257 | 8/1971 | Reinhardt | 350/310 |
| 3,644,022 | 2/1972 | Jagdt | 350/310 |

*Primary Examiner*—Ronald L. Wibert
*Assistant Examiner*—Michael J. Tokar
*Attorney, Agent, or Firm*—Donald A. Streck

[57] ABSTRACT

A reflective mirror structure comprising a concave uniform thickness honeycomb sandwich core and face plates. The sandwich carries a mirror base surface mounted on a ductile isolator material. The isolator material is characterized by its low coefficient of expansion, low thermal conductivity, and precision uniformity of support.

4 Claims, 4 Drawing Figures

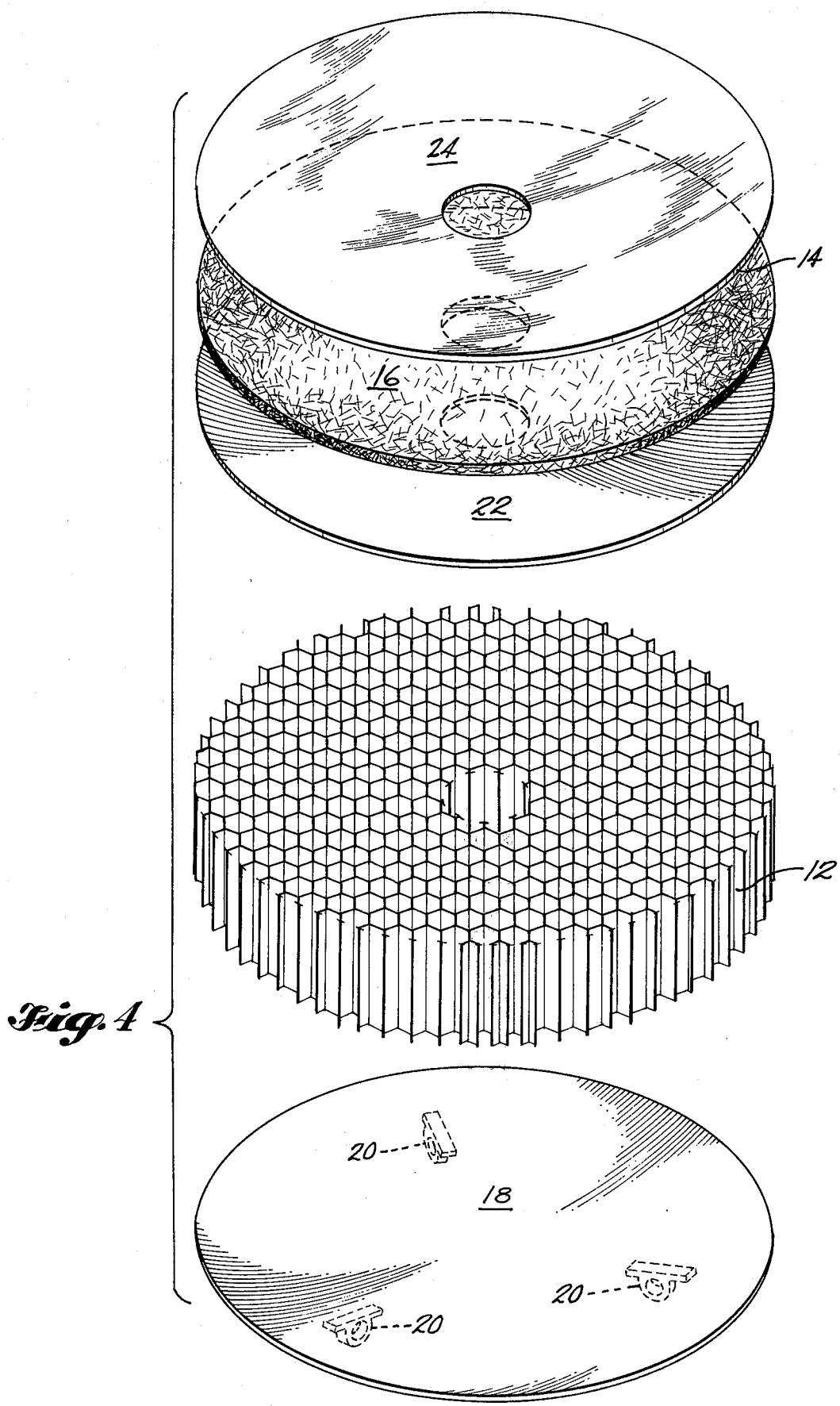

COMPOSITE TYPE STRUCTURE FOR LARGE REFLECTIVE MIRRORS

BACKGROUND OF THE INVENTION a. Field of the Invention

The present invention relates to mirrors, and more particularly to a structure for large reflective mirrors used for astronomical telescopes.

b. Description of the Prior Art

Large optical elements are necessary for such fields of developing technology as ground/space astronomy, ground-to-space and space-to-ground surveillance for military and nonmilitary needs, laser space-to-ground communications, and solar concentrators. The fundamental requirements for these applications are rigidity, thermal stability, weight, and cost. Space applications provide the most severe limitations on rigidity, thermal stability and weight. Ground applications provide the most severe limitations on cost. Specific requirements are typically:

1. Rigidity — The most severe space application requires a structural rigidity where no nonuniform permanent deformation can occur on the mirror surface after the mirror has been fabricated which is greater than $6 \times 10^{-7}$ inches.
2. Thermal Stability — The local surface accuracy of $6 \times 10^{-7}$ inches must be maintained in space recognizing that the temperature environment the mirror will most likely experience on the ground prior to shipment into space is 70° while the operating temperature in space is estimated to be about −40° F.
3. Weight — Because of the very high dollar per pound of space transportation, the mirror weight must be low. Even in ground applications, weight is a major factor since the mirror must be mounted and provides a large leverage which must be counteracted by the other elements of the observatory. For example, a ground observatory may have a 240 inch diameter primary mirror weighing 40 tons while the required supporting structure weighs 300 tons.

The integral type structure in the static structural classification represents the main practical experience of large mirrors. The criteria of an integral mirror is that it be of one material and may be cast or built-up using many components. Many materials have been tried including metal, glass, and quartz. To meet space requirements, only quartz and crystallized glass are acceptable.

The prior art discloses numerous examples of the use of honeycomb type backing to effect a total weight reduction. No example, however, has been found teaching a corresponding solution for the problems of rigidity and thermal stability as does the present invention in its disclosure of a unique composite structure for large reflective mirrors.

Therefore, it is an object of the present invention to provide a composite type structure for large reflective mirrors which is of minimum weight.

It is a further object of the present invention to provide a composite type structure for large reflective mirrors which has a degree of rigidity sufficient to meet space requirements.

It is another objective of the present invention to provide a composite type structure for large reflective mirrors which is thermally stable within the range of temperatures imposed by space requirements.

It is yet another objective of the present invention to provide the above attributes in a composite type structure for large reflective mirrors which is easy to fabricate and requires a minimum of specialized equipment.

Other objects and many of the attendant advantages of this invention will be readily appreciated as the same becomes better understood by reference to the following detailed description when considered in connection with the accompanying drawings.

DESCRIPTION OF THE DRAWINGS

FIG. 4 is an exploded view of the parts of the subject composite type mirror.

DESCRIPTION AND CONSTRUCTION OF THE INVENTION

Figure 1:
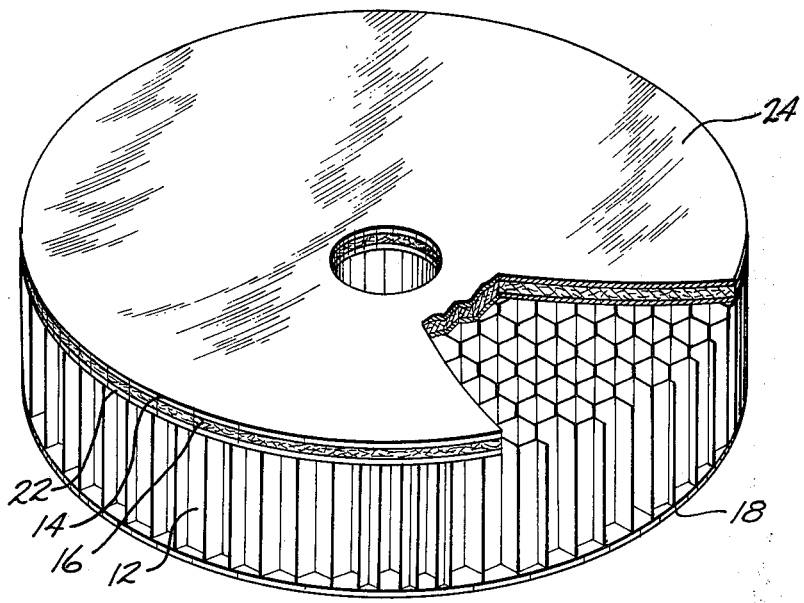
FIG. 1 is an overall view of the subject composite type mirror with the surface portion partially cut away.
Figure 2:
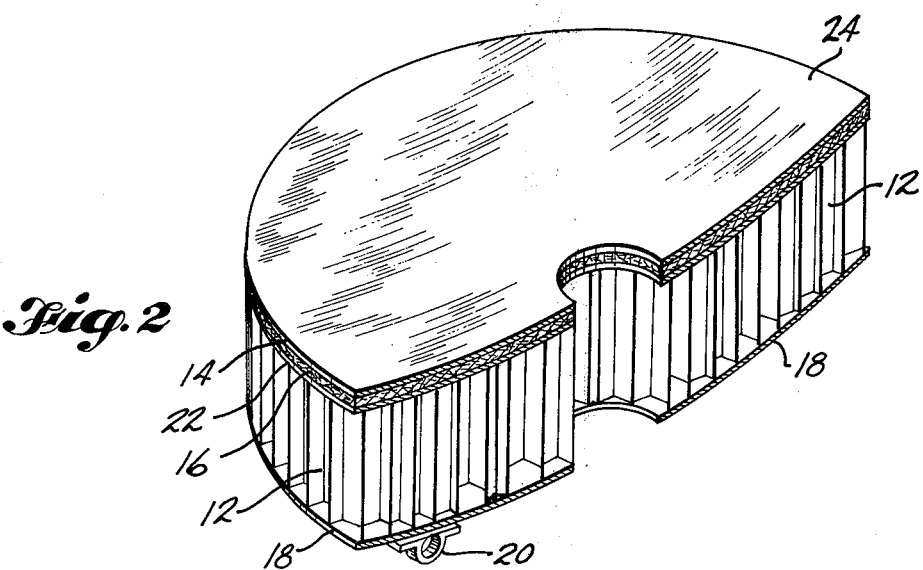
FIG. 2 is a fully cutaway view of the subject composite type mirror.

As depicted in FIGS. 1, 2, and 4, the foundation for the reflective mirror composite structure is an integral honeycomb structure 12. In the preferred embodiment, the honeycomb structure 12 is of aluminum. However, commercial materials such as fiberglass or paper/nylon could be used. The top and bottom surfaces of the honeycomb structure 12 are milled to the required shape prior to assembly. The top surface of the honeycomb structure 12 is milled to the concave shape of a mirror 14. The accuracy of such top suface need not be great since an isolator 16 will correct the inaccuracies. The bottom surface of the honeycomb structure 12 is milled in a convex shape so as to give a uniform thickness to the honeycomb structure 12. The use of a uniform thickness honeycomb structure 12 is a major point of the subject invention since it provides for a uniform thermal conductance and corresponding expansion in the thickness dimension of the foundation. The thickness of the foundation honeycomb structure 12 is designed to provide the required rigidity to protect the mirror in its most severe environment.

A bottom plate 18 is attached to the bottom surface of the honeycomb structure 12 using one of several bonding agents which are in common use today for space applications. Attachment fixtures 20 are attached to the bottom plate 18 for use in mounting the finished assembly to the telescope structure (not shown). The attachment would probably be of a three point suspension to avoid bending loads being imposed on the mirror assembly by the telescope structure.

A top plate 22 is attached to the top surface of the honeycomb structure 12 also using a standard bonding agent. Both the top plate 22 and the bottom plate 18 are fabricated from the same material as the honeycomb structure 12 for constant thermal expansion characteristics.

Figure 3:
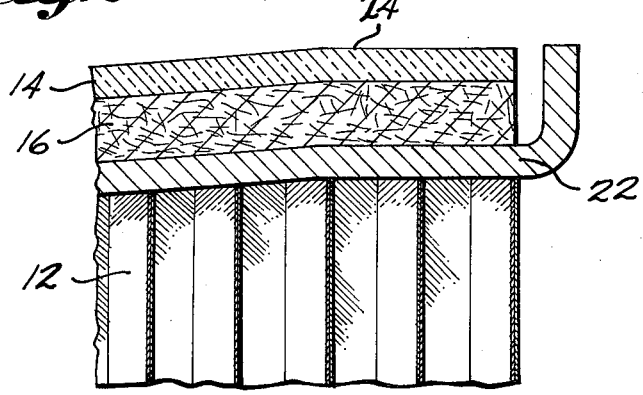
FIG. 3 is a cutaway view showing the detail of an optional configuration providing a thermal shield to the mirror surface edge.

FIG. 3 depicts an optional method for edge fabrication of the top plate 22. In this version, the top plate 22 does not terminate at the edge of the top surface of the honeycomb structure 12, but rather, is rolled up toward the mirror surface 14 so as to form a shade for the edge of the mirror surface 14. In this manner, the top plate 22 acts as a heat sink to transfer solar energy from the side across the whole bottom of the mirror 14 under the isolator 16. The including of the isolator 16 represents a major improvement in the present invention over the prior art. In the preferred embodiment the isolator is a felt material with fibers such as stainless steel. Felt material possesses characteristics particularly suited to this application. First, it has a two slope stress/strain curve. That is, under a slow force impact it acts like a feather pillow to cushion the mirror 14. Yet, in response to a sudden impact force it responds to withstand the destructive forces upon it. In addition to this, the felt isolator 16 is a very good insulator to prevent heat transfer from the top plate 22 to the mirror 14 and has a substantially zero coefficient of expansion. Thus, the isolator 16 serves as a very uniform support to the mirror base and acts as a hydrostatic type support in its characteristics. Also, the isolator 16 allows normal fabrication tolerances to occur in the bottom surface of the mirror 14 and the top plate 22 of the foundation.

The isolator 16 is bonded on one surface to the top plate 22 and on the opposite surface to the bottom of the mirror 14. The mirror 14 is a constant thickness relatively thin sheet of base material on which a reflective surface 24 is fabricated. The preferred embodiment material for the mirror 14 is crystallized glass with quartz as a second choice. The mirror 14 as bonded to the top surface of the isolator 16 is of uniform thickness and is fabricated so that it curves to the general shape of the final reflective surface 24. After assembly, the reflective surface 24 is fabricated in the conventional manner by grinding, polishing, aluminum vapor deposited, and finally, if required, magnesium floride overcoated.

In summary, the present invention is:
1. A structural foundation providing a very rigid base at a very low weight and cost;
2. A mirror base which can be thin enough so that the ideal mirror base material with an inherent high density factor can be used and not contribute significant weight to the total mirror assembly;
3. An isolator providing a highly elastic attachment between the foundation and mirror base so as to serve as a coupling between the two surfaces, to avoid local micro deflection in the foundation entering the mirror base, to insure a very uniform support to the mirror base and provide a thermal insulation between the two major mirror assembly elements, and
4. Assembly of these components in a static structure which should be capable of protecting the highly delicate reflective mirror surface in the most severe space application environment.

Having thus described the invention, what is claimed is:

1. A reflective mirror composite structure comprising in combination:
   a. a first plate;
   b. a honeycomb foundation means of substantially constant thickness carried by said first plate;
   c. a second plate carried by said honeycomb foundation means;
   d. a felt isolator means carried by said second plate; and
   e. a reflective means carried by said felt isolator means and having a reflective surface on one side thereof.

2. A reflective mirror composite structure as claimed in claim 1 wherein said isolator means is a metal felt material.

3. A reflective mirror composite structure as claimed in claim 1 wherein said isolator means is a felt material of synthetic fibers.

4. A reflective mirror composite structure as claimed in claim 1 wherein said second plate has its circumferal edge shaped so as to be disposed adjacent to the edges of said isolator means and said reflective means so as to provide a thermal shield for the circumferal edge of said reflective means.

* * * * *